United States Patent
Watkins

(10) Patent No.: US 7,150,067 B1
(45) Date of Patent: Dec. 19, 2006

(54) WINDSHIELD CLEANING APPARATUS WITH FLUID CHANNEL BLADES

(76) Inventor: Timothy Joseph Watkins, P.O. Box 56092, Hardwoood Heights, IL (US) 60656-0092

( * ) Notice: Subject to any disclaimer, the term of this patent is extended or adjusted under 35 U.S.C. 154(b) by 0 days.

(21) Appl. No.: 11/213,404

(22) Filed: Aug. 29, 2005

(51) Int. Cl.
B60S 1/28 (2006.01)

(52) U.S. Cl. ............................. 15/250.41; 15/250.48
(58) Field of Classification Search .............. 15/250.4, 15/250.41, 250.48, 250.361, 250.04
See application file for complete search history.

(56) References Cited

U.S. PATENT DOCUMENTS

| 1,978,192 | A | * | 10/1934 | Freud ..................... 15/250.41 |
| 2,080,129 | A | * | 5/1937 | Gulotta ................... 15/250.41 |
| 4,339,839 | A | * | 7/1982 | Knights .................. 15/250.04 |
| 4,649,593 | A | * | 3/1987 | Gilliam et al. .......... 15/250.41 |
| 5,235,720 | A | * | 8/1993 | Kinder .................... 15/250.4 |
| 6,119,300 | A | | 9/2000 | Schmid |
| 7,007,340 | B1 | * | 3/2006 | James ..................... 15/250.41 |
| 2003/0229960 | A1 | * | 12/2003 | Stouder, II ............. 15/250.41 |

FOREIGN PATENT DOCUMENTS

| DE | 2610941 | * | 10/1977 |
| DE | 2748087 | * | 6/1978 |
| FR | 2415493 | * | 8/1979 |

* cited by examiner

Primary Examiner—Gary K. Graham

(57) ABSTRACT

A windshield cleaning apparatus for clearing insect splatters and similar debris from a windshield having a single elongate wiping blade (16) near one extreme lengthwise edge, a elongate series of imbricate wiping blades near the opposite extreme lengthwise edge (20ah), and a elongate cleaning element (18) disposed in the center that allows cleaning fluids dispersed (48) on the windshield by the vehicles existing fluid dispensing system to be channeled (42) into the cleaning elements and blocked by the single wiping blade in a specific direction of travel (FIG. 7), and in the opposite direction of travel (FIG. 8) the series of imbricate wiping blades back side area (46) deflect dirty cleaning fluids out of the apparatus (50) aided by aid from a series of air channel openings (22ag).

1 Claim, 4 Drawing Sheets

Windshield Cleaning Apparatus with Fluid Channel Blades in standard carrier frame embodiment Windshield Cleaning Apparatus with Fluid Channel Blades in standard carrier frame embodiment Windshield Cleaning Apparatus with Fluid Channel Blades with insert adapter strip embodiment Elongate platform base assembly Angled fluid channel blades and air channel passes Elongate cleaning assembly insert Cleaning element assembly Right to left
direction of travel Left to right
direction of travel

WINDSHIELD CLEANING APPARATUS WITH FLUID CHANNEL BLADES

BACKGROUND

1. Field of Invention

This invention relates to the cleaning of insect splatters from a automobile, truck or bus windshield, more particularly pertains to the removal of insect splatters that are smeared by rubber-type windshield wipers passing over the splatters.

2. Description of Prior Art

During spring, summer and fall on most rural roadways, insects are attracted to vehicle headlights, and as a result collide and splatter on the windshield. Standard rubber type wiper blades tend to remove the largest parts of the splatters, however the rubber wipers tend to leave a smear that requires a driver to frequently stop and clean the windshield when insects are in large concentrations. Methods for cleaning windshields is known prior art. More specifically, windshield cleaning devices are known to consist basically of familiar, expected and obvious structural configurations, not withstanding the myriad of designs encompassed by crowded prior art which have been developed for the fulfillment of countless objectives and requirements.

The current invention is directed toward improving devices that clean windshields, more specifically, to removing insect splatter smears in a manner that is safe, aesthetically pleasing, and economical to the consumer.

For example U.S. Pat. No. 4,639,593 to Gilliam (1987) describes a wiper assembly including at least one wiper or squeegee blade with a scrubbing element in the form of a mesh covered flexible tubular member formed integrally with the wiping blade as a one piece extrusion. Combining a scrubbing and wiping blade assemblies have several short comings, for example, these assemblies tend to leave streaks on the windshield, nor does this invention account for cleaning the scrubber, or provide washing fluid to the scrubbing element to prevent streaking.

U.S. Pat. No. 5,235,720 to Kinder (1993) describes an elongate scrubbing blade attached to a blade support having a scrubbing portion that includes a base tip projecting from the base, a scrubbing blade, including a scrubbing mesh capable of passing debris through elongated channels. At least one wiper blade clears a windshield in one direction and a scrubber blade clears the windshield in the other direction. This would tend to leave streaks in one direction because the invention does not teach or provide for cleaning fluid to clean and moisturize the scrubbing mesh when the scrubbing mesh is traveling in a direction following to clearing blade.

U.S. Pat. No. 6,119,300 to Schmid, et al. (2000) describes a plurality of individual segments mutually spaced lengthwise on the wiper blade rubber, wherein the segments overlap to a certain degree, and in that a washer fluid conduit runs lengthwise in the backing and has fluid openings for discharging washer fluid to the windshield. This process would require modifications be made to existing automobile fluid dispensing systems, and could become complicated when automobiles have fluid systems built into hood lids with limited access to fluid lines. In respect, the windshield cleaning apparatus with fluid channel blades according to the present invention substantially decreases the conventional concepts and designs of the prior inventions, and in doing so provides an apparatus primarily developed for the purpose of cleaning the smearing effect caused by rubber windshield wipers passing over insect splatters, which greatly reduces a vehicle operators visibility and ability to operate a vehicle in a safe manner. This present invention achieves its intended objects and advantages through a new and useful unobvious combination of methods, steps and components with the use of a minimum number of functional parts at a reasonable cost to manufacture with readily available materials.

OBJECTS AND ADVANTAGES

Accordingly, besides the objects and advantages of the inventions process to clean a windshield, several additional objects and advantages of my invention are:

(a) to provide a windshield cleaning apparatus that can be universally applied to a variety of vehicle windshields, thereby precluding the need to manufacture a wide variety of different windshield cleaning devices, (b) to provide a windshield cleaning apparatus that requires no modifications be made to existing windshield wiping assemblies or cleaning fluid dispersing systems, (c) to provide a windshield cleaning apparatus that is aesthetically pleasing, (d) to provide a windshield cleaning apparatus that is easy to install at an inexpensive price to the consuming public.

(e) to provide a windshield cleaning apparatus that can be easily removed and stored for future use.

The foregoing has outlined some of the more pertinent objects of the invention. These objects should be construed to be merely illustrative of some of the more prominent features and applications of the present invention. Many other beneficial results can be attained by applying the disclosed invention in a different manner or by modifying the invention within the scope of the disclosure. Therefore, it can be appreciated that there exist a continuing need for a windshield cleaning device, in this, the present invention substantially fills this need. The prior art and commercial techniques do not suggest the inventive combination of components elements and features configured as disclosed and claimed herein. Still further objects and advantages will become apparent from a consideration ensuing description and drawings.

DRAWING FIGURES

In the drawings, closely related figures have the same number but different alphabetical suffixes.

REFERENCE NUMERALS IN DRAWINGS

Figure 1:
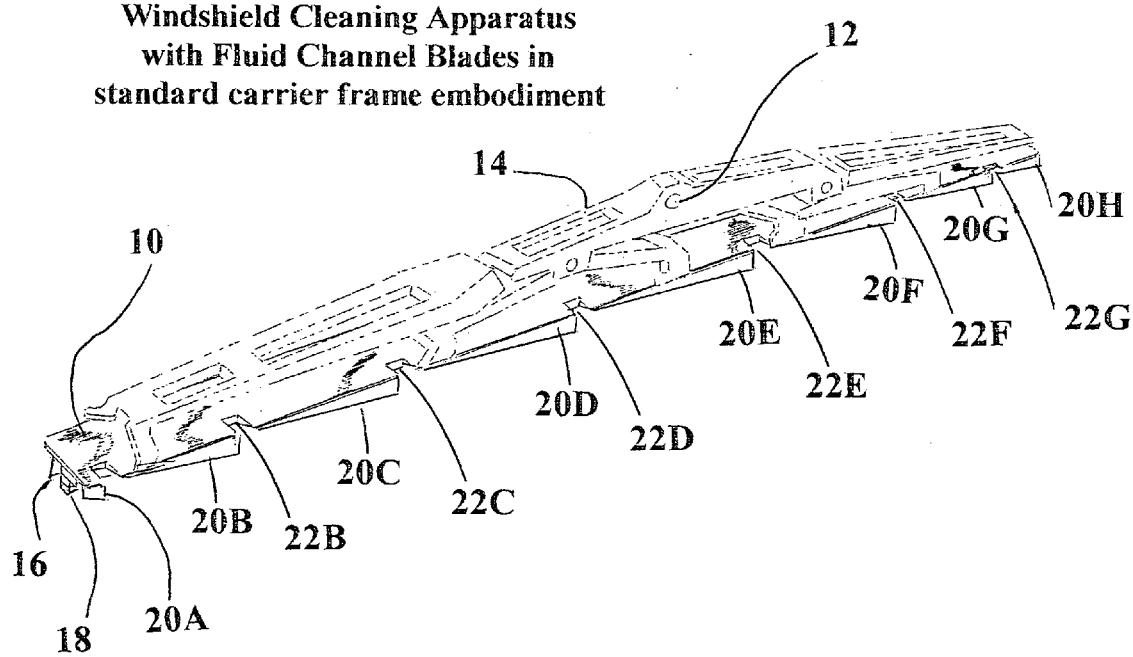
FIG. 1 shows a perspective view illustrating the embodiment of this invention
Figure 2:
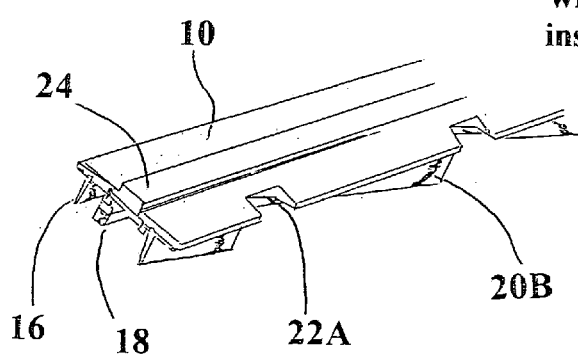
FIG. 2 shows a perspective view illustrating the manner of construction of the current invention with the insert strip embodiment.
Figure 3:
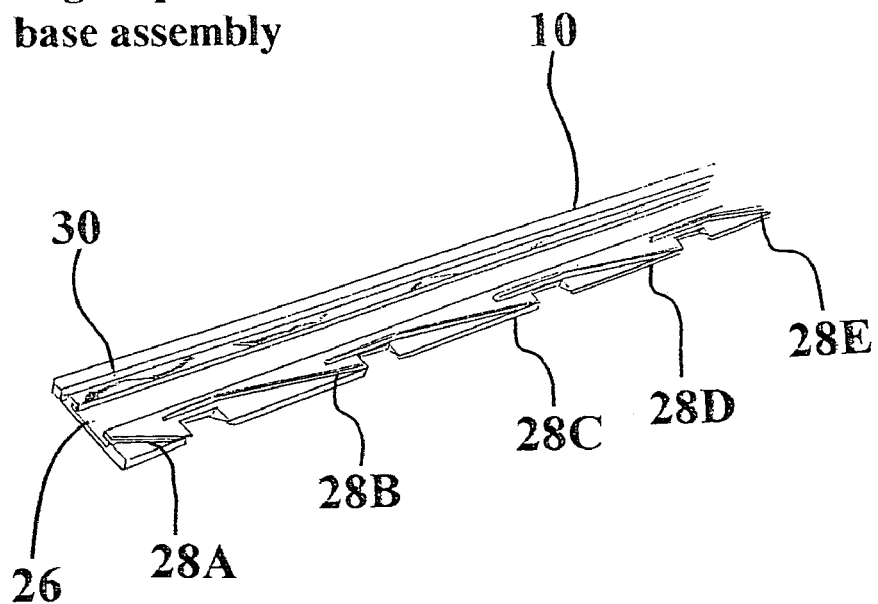
FIG. 3 shows a perspective view illustrating the manner of construction for the elongate platform base assembly.
Figure 4:
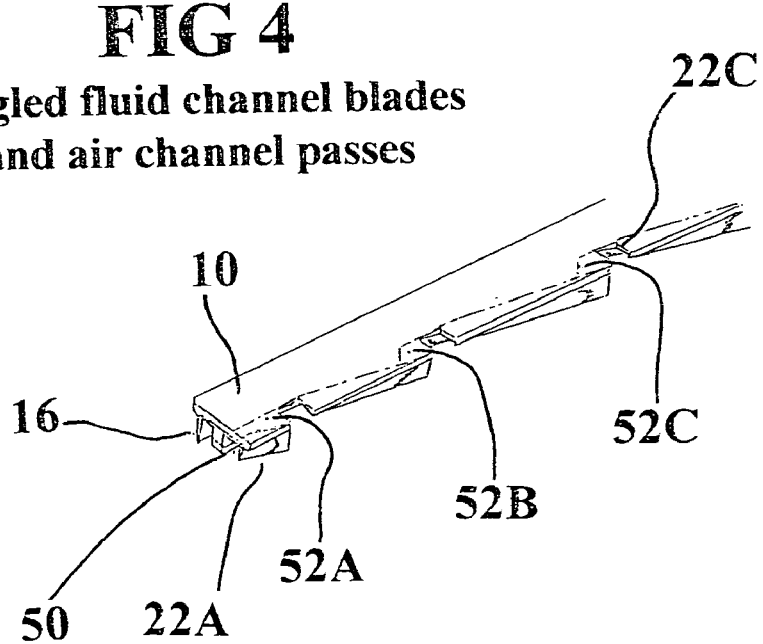
FIG. 4 shows a perspective view illustrating the manner of construction and placement of the angled fluid channel and air channel openings.
Figure 5:
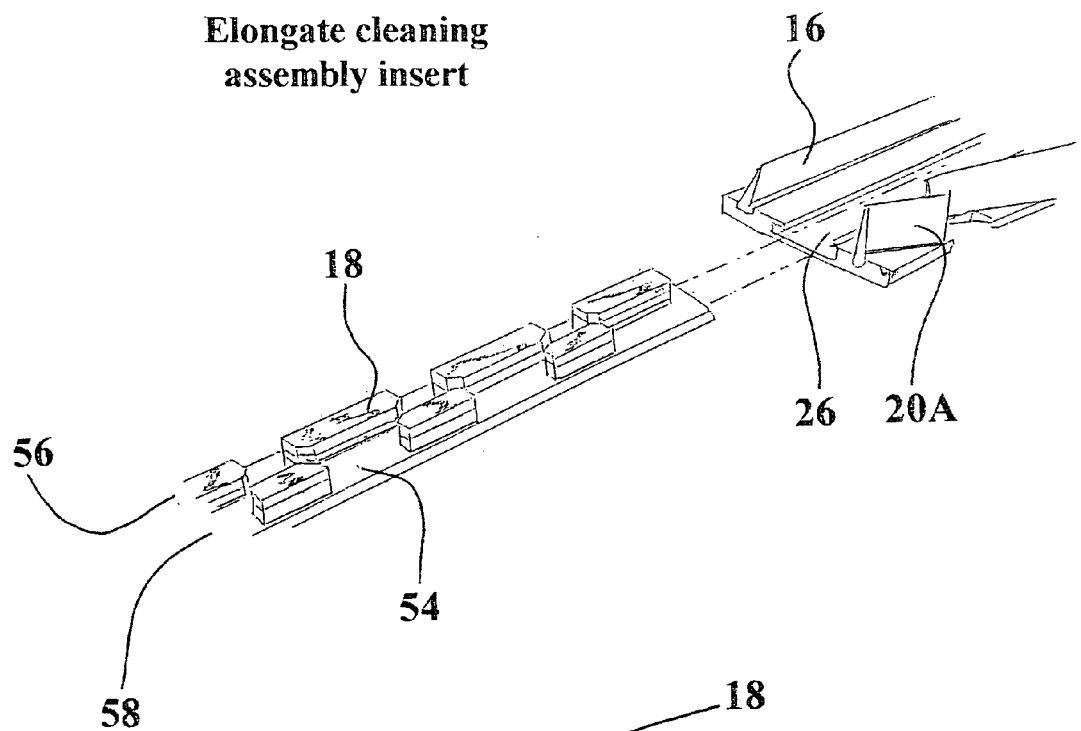
FIG. 5 shows a perspective view illustrating the manner of construction and placement of the elongate cleaning assembly insert.
Figure 6:
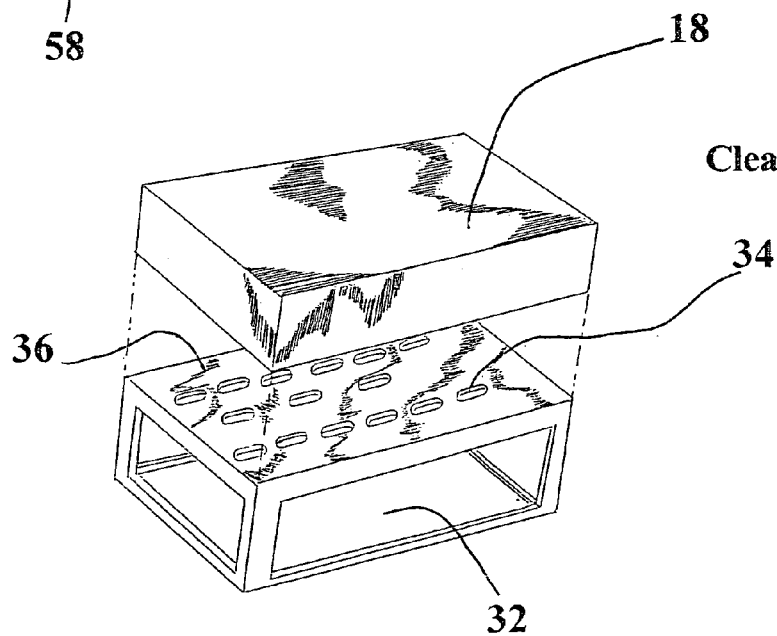
FIG. 6 shows a perspective view illustrating the manner of construction of the cleaning element(s)

| 10 | elongate base platform | 12 | wiper arm connection point |
|---|---|---|---|
| 14 | frame assembly | 16 | elongate wiper blade |
| 18 | plurality of cleaning element | 20ah | angled fluid channel blades |
| 22ag | air channel vents | 24 | elongate strip insert |
| 26 | receiver slot | 28ah | angled fluid channel blade inserts |
| 30 | wiper blade insert groove | 32 | adhesive |
| 34 | cleaning element rinse holes | 36 | open box frame |
| 38ab | direction change position | 40 | right to left fluid intake path |
| 42 | left to right fluid direction of travel | 44 | axis of rotation |
| 46 | angled fluid channel blade deflection | 48 | dispersed cleaning fluid |
| 50 | upper opening area | 52ag | air channel pass |
| 54 | cleaning assembly insert strip | 56 | first line elements |
| 58 | second line elements | 60 | lower flow opening area |

SUMMARY

In accordance with the present invention, the windshield cleaning apparatus with fluid channel blades comprises a elongate platform base adapted to slidably connect to a wiper assembly frame, or constructed as a separate embodiment that is adapted to connect to the vehicles existing windshield wiper arm without any modifications to existing equipment. Disposed on the platform base near one extreme lengthwise edge is a elongate wiper blade that performs the same function as a standard wiper blade and makes the 1$^{st}$ and last past over a windshield in the operation cycle. A elongate series of overlapping angled fluid channel blades are disposed near the opposite extreme lengthwise edge, and a cleaning assembly insert strip is disposed slidably into a elongate receiver slot between the single wiper blade and series of overlapping angled wiper blades. Cleaning elements are disposed on the insert strip in a 1$^{st}$ and 2$^{nd}$ elongate row and are spaced in a manner that allows no gaps, and do not make contact with each other and allow fluid and debris passage. The cleaning elements are disposed on an open box frame equipped with rinse holes on the surface where the element(s) are attached so that fluid channeled in by the angled fluid channel blades can rinse and clean the elements to prevent streaking of the windshield. In one specific direction of travel, fluid dispersed onto a windshield is channeled into the cleaning elements and away from the wiper assemblies axis of rotation, and in the opposite direction of travel cleaning fluid and debris is forced away from the axis of rotation and out of an opening by the force excerpted by the wipers motion and deflection from the back side of the angled fluid channel blades. Forced air from a series of air channels openings disposed near the overlap point of the series of angled fluid channel blades channel air created by the speed of the vehicle into air channel passes between the overlapping points and subsequent angled fluid channel blade to assist the fluid channel blades in forcing cleaning fluid and debris into the scraping element area and out of the apparatus through to upper opening area. A lower flow opening is disposed on the bottom of the apparatus to aid in air and fluid flow through the apparatus. No modifications are required to the vehicles existing fluid dispensing system. These together with other objects of the invention, along with the various features of novelty which characterize the invention, are pointed out with particularity in the claims annexed to and forming part of this disclosure. For a better understanding of the invention, its operating advantages and the specific objects attained by its uses, reference should be made to the accompanying drawings and descriptive matter in which there are illustrated embodiments of the invention.

Description—FIGS. 1 to 8

A typical embodiment of the current invention is illustrated in FIG. 1 and constructed as an entire windshield wiper assembly 14 or as a embodiment adapted to be slidably inserted 24 into an existing wiper blade insert brackets. The current invention consist of a windshield wiper frame 14 and all other components with the exception of the elongated wiper blade 16, angled wiper blades 20ah and cleaning elements 18 being constructed of any suitable semi-rigid waterproof composition. The current invention is connected to the existing wiper arm connection point 12 or, if the slidable embodiment is utilized FIG. 2, the existing blade insert is removed and this current invention inserted. There is an elongate platform base 10 disposed on the bottom side of the windshield wiper frame assembly.

Figure 7:
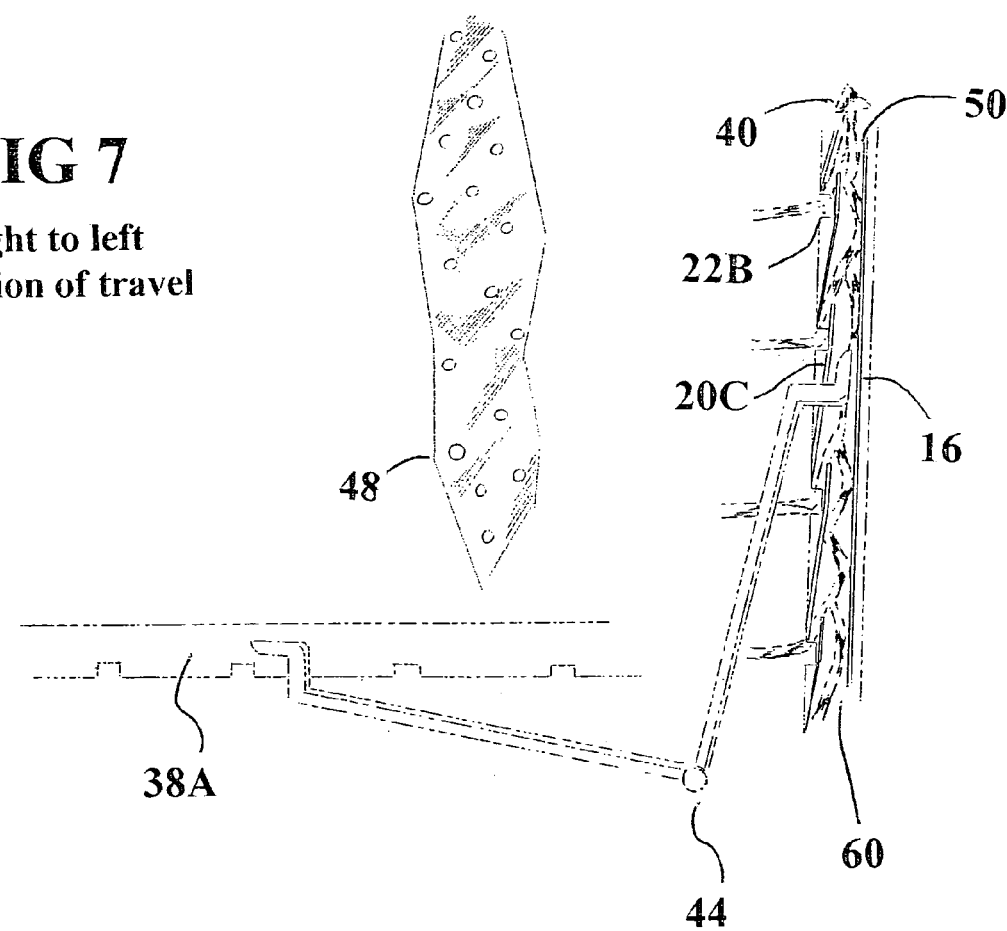
FIG. 7 shows a perspective view illustrating movement of fluid and debris in the right to left direction of travel.

On one side of the elongate platform base near the extreme lengthwise edge is a elongate wiper blade 16, that is slidably inserted into a elongate insert strip 54 and performs the same function as a standard rubber type wiper blade by removing the largest insect debris on the first cycle from the axis of rotation 44 in a right to left direction of travel FIG. 7, being the standard first cycle of rotation for most windshield wiper assemblies. For vehicles such as trucks, busses and some automobiles that may have a different cycle of rotation for the wiper assemblies, or have the axis of rotation on the top or side, the manufacturer of this current invention only needs to position the single wiper blade so that on the first pass it clears any large debris, and makes the final pass in the cycle of operation, angled wiping blades are angled to force fluids and debris away from axis of rotation. Angled wiper blades 20ah are disposed on the opposite side of the elongated wiper blade near the extreme lengthwise edge in angled fluid channel insert grooves 28ah.

Figure 8:
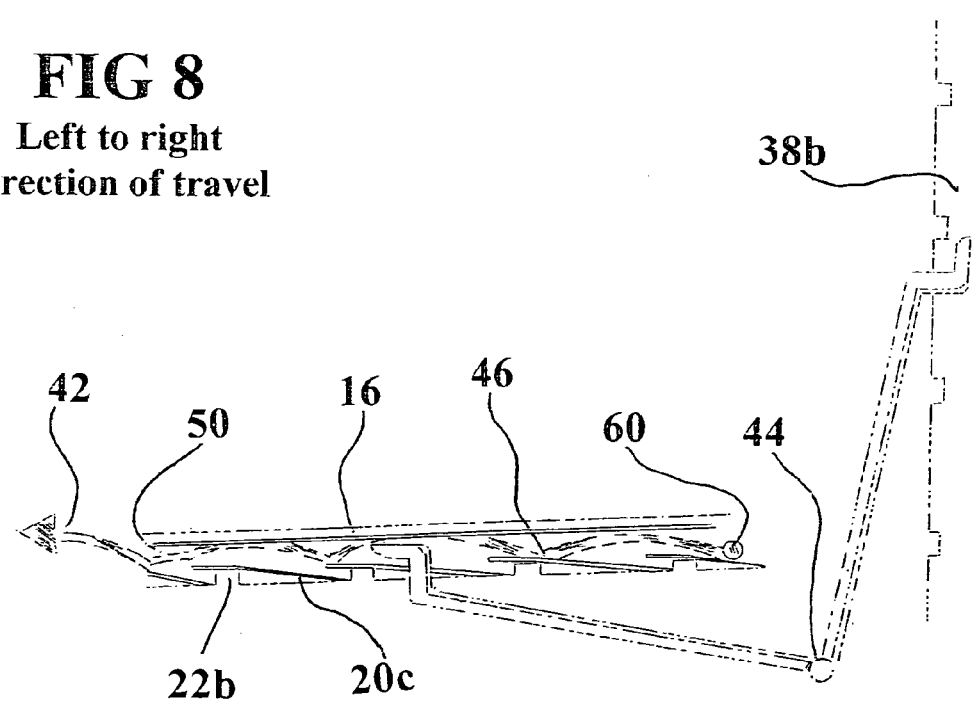
FIG. 8 shows a perspective view illustrating movement of fluid and debris in the left to right direction of travel.

The angled wiper blades are disposed in a overlapping manner to channel fluid and debris in the left to right direction of travel FIG. 8, 42, off the back sides of the angled wiper blades 46 and out of the upper fluid opening area 50. In the opposite direction of travel FIG. 7, the angled fluid channel blades force dispersed cleaning fluid 48 in towards the cleaning elements and away from the axis of rotation. Air channel vents 22ag assist in forcing cleaning fluid and debris in towards the cleaning elements that are disposed lengthwise between the wiper blade and series of angled wiper blades. A lower flow opening area 60 is disposed at the bottom of the apparatus to facilitate air and fluid flow through the apparatus. A elongate cleaning insert assembly 30 is slidably placed into a receiver slot 26. Cleaning elements 18 are constructed of a suitable flexible material similar to a thick scouring pad to allow the cleaning elements vertical flexibility, to allow for wear in the rubber wiper blades, and allow fluid the ability to pass through the cleaning elements to rinse dirty cleaning fluid and debris from the cleaning elements which helps to reduce streaking of the windshield. A series of open box frames 36 are disposed on the elongated cleaning insert assembly and are arranged in a first line 56 evenly spaced, and a second line 58 evenly spaced and offset from the first line so FIG. 5, that have no gaps and fluids can easily pass through. On the top side of the open box frames are a series of holes 34 that serve as ports to allow fluid passage into the cleaning elements to assist in rinsing the cleaning elements. Disposed on the top side of the elongated series of angled wiper blades near the overlap positions are air channel vents 22 that allow air from the vehicles forward motion to follow the natural flow of air over a windshield to be channeled into air channel passes 52 that assist in forcing fluid and debris into the cleaning elements and out of the apparatus on the left to right cycle of operation, and in the opposite direction of travel, assist in channeling cleaning fluid dispersed 48 on the windshield into the cleaning elements. Upper fluid opening area 50 and lower fluid channel opening area 60 are disposed on both ends of the current invention to allow air and fluid to enter in the bottom opening and exit the top. A number of advantages of this invention become evident (a) provides a durable inexpensive means to clean a vehicles windshield of insect splatters in a manner that is safe, (b) provides a windshield cleaning method that requires no modifications be made to existing vehicle fluid dispensing assemblies or windshield wiper connection points, (c) can be manufactured and marketed easily as a after market product designed specifically for use on roadways, especially at night, dusk and sunrise when visibility is already greatly reduced and insects are abundant, (d) can be manufactured in different sizes just as replacement wiper blades are at auto part stores to accommodate all vehicles, to include trucks and buses.

(e) provides a product that can be easily connected and disconnected.

(f) provides a product that can be removed and stored when insects are dormant, and will also perform in the conventional manner.

Operation—FIGS. 1,2,3,4,5,6,7,8

The manner of using the Windshield Cleaning Apparatus with Fluid Channel Blades is to remove the existing windshield wiper assembly from the wiper arm connection point 12 and place the current invention on the existing connection point. If the manufacturer manufactures a slidable embodiment FIG. 2, of this current invention, then the existing wiper blade insert is removed and this current invention inserted. The current invention can be used on both passenger and drivers side windshield. The current invention is disposed on the wiper arm connection point so that while seated in a vehicle with the windshield wipers in the "off" position, the elongated wiper blade 16 is on the top nearest the vehicles roof. The elongated wiper blade must make the $1^{st}$ and last pass in the cycle of operation. To use the current invention, the user needs to turn the wiper speed switch to the high speed position, and activate the cleaning fluid dispenser until the smears are gone. The current invention can be removed and stored when insects are dormant, and in icy conditions to prolong use.

SUMMARY, RAMIFICATIONS AND SCOPE

Accordingly, the reader will see that the Windshield Cleaning Apparatus with Fluid Channel Blades can be used to inexpensively and conveniently to clear insect smears caused by rubber type windshield wipers passing over the splatters in an attempt to clean the windshield. As to the manner of usage and operation of the present invention, the same should be apparent from the above description, accordingly, no further discussion relating to the manner of usage and operations will be provided. With respect to the above description, then it is to be realized that optimum dimensional relationships for parts of the invention, to include variations in size, materials shape, form, fit function, and manner of operation, assembly and usage, are deemed readily apparent and obvious to one skilled in the art, and all equivalent relationships to those illustrated in the drawings and described in the specifications are indeed to be encompassed by the present invention. Therefor, the foregoing is considered as illustrative only of the principles of the invention further, since numerous modifications will readily occur by those skilled in the art, it is not desired to limit the invention to exact connection and orientation shown and described, and accordingly, all suitable modification and equivalents may be resorted to, falling within the scope of the invention. In as much as the present disclosure includes all contained in the appended claims as well as that of the foregoing description, and although this invention has been described in its preferred forms with a certain degree of particularity, it is understood that the present disclosure of the preferred form has been made only by way of example and numerous changes in details of construction and combination and arrangement of parts may be resorted to without departing from the spirit and scope of the invention. Thus the scope of this invention should be determined by the appended claims and their equivalents, rather than by examples given.

I claim:

1. In a windshield cleaning apparatus for clearing a vehicle windshield of insect splatters and similar debris comprising:

an elongated apparatus including a single elongated wiper blade, an elongated plurality of imbricate wiping blades; an elongated plurality of cleaning elements sandwiched between said single wiper blade and said plurality of imbricate wiping blades, and said single wiping blade disposed in a manner to make a first and final pass over a surface of the windshield, said plurality of elongated imbricate wiping blades are disposed at a predetermined oblique angle to channel cleaning fluids deposited on the windshield by an existing fluid dispensing system into a direction of said elongated plurality of sandwiched cleaning elements in a specific direction of movement of said apparatus, in an opposite direction of movement said plurality of elongated imbricate wiping blades deflect fluids and debris out of said apparatus, respectively.

* * * * *